US00RE44909E

(19) United States
(12) Reissued Patent
Brice

(10) Patent Number: US RE44,909 E
(45) Date of Reissued Patent: May 27, 2014

(54) VACUUM VENTURI APPARATUS AND METHOD

(76) Inventor: John L. Brice, New Braunfels, TX (US)

(21) Appl. No.: 13/357,675

(22) Filed: Jan. 25, 2012

Related U.S. Patent Documents

Reissue of:
(64) Patent No.: 7,416,171
Issued: Aug. 26, 2008
Appl. No.: 11/045,826
Filed: Jan. 27, 2005

(51) Int. Cl.
*B01F 3/04* (2006.01)

(52) U.S. Cl.
USPC ..... 261/76; 261/DIG. 75

(58) Field of Classification Search
USPC ..... 261/76, 116, 118, DIG. 75; 137/888; 138/44; 239/311, 318, 428.5, 433, 434
See application file for complete search history.

(56) References Cited

U.S. PATENT DOCUMENTS

| | | | |
|---|---|---|---|
| 2,510,396 | A | 6/1950 | Goodrie |
| 2,562,096 | A | 7/1951 | Herrmann |
| 2,724,583 | A | 11/1955 | Targosh et al. |
| 2,891,913 | A | 6/1959 | Welford |
| 2,899,971 | A | 8/1959 | Munter |
| 3,154,101 | A | 10/1964 | Cravits |
| 3,704,008 | A | 11/1972 | Ziegler |
| 3,797,747 | A | 3/1974 | Buzzi et al. |
| 3,799,450 | A | 3/1974 | Braukman |
| 4,019,720 | A | 4/1977 | Levesque et al. |
| 4,132,838 | A | 1/1979 | Kreuer et al. |
| 4,138,330 | A | 2/1979 | Garrett |
| 4,333,833 | A | 6/1982 | Longley et al. |
| 4,432,105 | A | 2/1984 | Pitroda |
| 4,573,639 | A | 3/1986 | Logue |
| 4,657,185 | A | 4/1987 | Rundzaitis |
| 4,881,575 | A | 11/1989 | Smith |

(Continued)

FOREIGN PATENT DOCUMENTS

| | | |
|---|---|---|
| CA | 1216613 | 1/1987 |
| WO | 92/11948 | 7/1992 |

OTHER PUBLICATIONS

International Preliminary Report on Patentability, PCT/US06/02891, dated Nov. 13, 2007.

(Continued)

*Primary Examiner* — Charles Bushey
(74) *Attorney, Agent, or Firm* — Warner Norcross & Judd LLP

(57) ABSTRACT

A vacuum venturi apparatus includes a plug with a first opening, a second opening and a third opening. The first opening is located in the plug so as to receive fluid from a source of fluid and the first opening has a single uniform diameter. The second opening in the plug is connected to the first opening and the second opening has a first diameter and a second diameter and the first diameter is larger than the second diameter and the second diameter is the same as the single uniform diameter of the first opening. Further, the second opening second diameter is connected to the first opening. The third opening is located in the plug and is open to the atmosphere. The third opening has a first diameter and a second diameter and the first diameter is larger than the second diameter and the second diameter is smaller than the single uniform diameter of the first opening, Further, the third opening second diameter is connected to the first opening. Further, the third opening may or may not have an attachment for the purpose of directing a vacuum line to a reservoir.

20 Claims, 1 Drawing Sheet

(56) References Cited

U.S. PATENT DOCUMENTS

| | | | | |
|---|---|---|---|---|
| 4,911,836 | A | 3/1990 | Haggerty | |
| 5,111,994 | A | 5/1992 | Gonzalez | |
| 5,356,076 | A | 10/1994 | Bishop | |
| 5,514,267 | A | 5/1996 | Machiya et al. | |
| 5,626,291 | A | 5/1997 | Flinn et al. | |
| 5,823,441 | A | 10/1998 | Nicholson | |
| 6,182,703 | B1 | 2/2001 | Brice | |
| 6,260,273 | B1 | 7/2001 | Brice | |
| 6,776,901 | B1 | 8/2004 | Vaughan et al. | |
| 7,416,171 | B2 * | 8/2008 | Brice | 261/76 |
| 8,104,745 | B1 * | 1/2012 | Fisenko | 261/21 |
| 2004/0251566 | A1 | 12/2004 | Kozyuk | |

OTHER PUBLICATIONS

Extended European Search Report, EP 06733958.0 (PCT/US06/02891), dated Jan. 30, 2009.

Applicant's Reply to the European Patent Office, EP 06733958.0 (PCT/US06/02891), dated Sep. 15, 2009.

Article 94(3) Examination Action, EP 06733958.0 (PCT/US/02891), dated Sep. 16, 2010.

Applicant's Reply to the European Patent Office, EP 06733958.0 (PCT/US06/02891), dated Mar. 23, 2011.

Rule 71(3) Grant Notification from the European Patent Office, EP 06733958.0, dated Nov. 24, 2011.

* cited by examiner

VACUUM VENTURI APPARATUS AND METHOD

Matter enclosed in heavy brackets [ ] appears in the original patent but forms no part of this reissue specification; matter printed in italics indicates the additions made by reissue.

FIELD OF THE INVENTION

This invention relates to a vacuum venturi apparatus and method. In particular, according to one embodiment, the invention relates to a vacuum venturi apparatus including a plug with a first opening, a second opening and a third opening. Multiple different diameters of these openings in a particular connected sequence accommodates the improvement which is the subject of this invention as more fully described hereafter. The vacuum venturi apparatus and method of the present invention greatly improves the efficiency of the flow of water from a shower nozzle and the like.

BACKGROUND OF THE INVENTION

As evidenced by the multiple patents obtained by the Applicant, the need for low flow water devices has not decreased over the years. In fact, the need has increased substantially. Applicant has been instrumental in creating low flow, high-pressure valves for many years. As always, the objective is to create a device that reduces water consumption and, therefore, increases efficiency and cost savings, without reducing the perceived pressure of water upon the user. Applicant incorporates by reference his prior art inventions as represented in U.S. Pat. Nos. 5,794,643; 6,182,703; and 6,260,273 by reference. While these inventions represent significant improvements over the prior art, nonetheless, the Applicant has determined that additional improvements are needed. It is desirable, still, for the low flow mechanism to deliver water to the user at as high a pressure as possible such that the user does not perceive a significant decrease in the flow of water.

Thus, there is a need in the art for providing an improved vacuum venturi apparatus and method that includes no moving parts, that enables the use of existing showerheads, and which provides a useful, powerful venturi effect.

SUMMARY OF THE INVENTION

The vacuum venturi apparatus and method of the present invention includes, according to one embodiment, a plug with a first opening, a second opening, and a third opening. The first opening is located in the plug so as to receive fluid from a source of fluid. The first opening has a single uniform diameter. The second opening in the plug is connected to the first opening. The second opening has a first diameter and a second diameter. The first diameter is larger than the second diameter and the second diameter is the same as the single uniform diameter of the first opening. The second opening second diameter is connected to the first opening. The third opening is located in the plug and is open to the atmosphere. The third opening has a first diameter and a second diameter. The first diameter is larger than the second diameter and the second diameter is smaller than the single uniform diameter of the first opening. The third opening second diameter is connected to the first opening.

According to another aspect of the invention, the second opening first diameter includes a larger flared section, open to the atmosphere, through which the fluid passes. According to another aspect of the invention, the third opening first diameter includes a larger flared section connecting with the smaller second diameter. According to another aspect, the plug is removably attached to a shower pipe. According to a further aspect, the plug is conformed to fit within the shower pipe and, according to another aspect, the plug includes connections for securing the plug to a shower pipe and connections for securing a shower head to the plug.

According to another aspect of the invention, the second opening first diameter is about 4.5 mm and the second opening second diameter and the diameter of the first opening are about 3 mm. According to another aspect, the larger flared section of the second opening is angled at about forty-five degrees and is about five mm in depth. According to another aspect, the larger flared section of the third opening is angled at about forty-five degrees and is about five mm in depth. According to a still further aspect, the third opening first diameter is about 2 mm and the third opening second diameter is about 1.5 mm.

According to another embodiment of the invention, a vacuum venturi apparatus includes a cylindrically shaped plug with a first opening, a second opening and a third opening. The first opening is located in the cylindrically shaped plug so as to receive fluid from a source of fluid. The first opening has a single uniform diameter. The second opening in the cylindrically shaped plug is connected to the first opening. The second opening has a first diameter and a second diameter wherein the first diameter is larger than the second diameter and the second diameter is the same as the single uniform diameter of the first opening. The second opening second diameter is connected to the first opening. The third opening is located in the cylindrically shaped plug, open to the atmosphere, and has a first diameter and a second diameter. The first diameter is larger than the second diameter and the second diameter is smaller than the single uniform diameter of the first opening. The third opening second diameter is connected to the first opening. The second opening first diameter includes a large flared section, open to the atmosphere, through which the fluid passes.

According to another aspect of this invention, the cylindrically shaped plug is removably attached to a shower pipe. According to another aspect, the cylindrically shaped plug is conformed to fit within a shower pipe. According to another aspect, the cylindrically shaped plug includes connections for securing the cylindrically shaped plug to a shower pipe and connections for securing a showerhead to the cylindrically shaped plug.

According to further aspects of the invention, the second opening first diameter is about 4.5 mm and the second opening second diameter and the diameter of the first opening are about 3 mm. According to another aspect, the second opening includes a larger flared section that is angled at about forty-five degrees and is about five mm in depth. According to another aspect of the invention, the third opening first diameter includes a larger flared section connecting with the smaller second diameter. According to another aspect, the third opening first diameter is about 2 mm and the third opening second diameter is about 1.5 mm. According to another aspect, the larger flared section of the third opening is angled at about forty-five degrees and is about five mm in depth According to another embodiment of the invention, a method of creating a vacuum venturi with a flow of liquid includes the steps of forming a cylindrically shaped plug with a first opening, a second opening and a third opening. Locating the first opening in the cylindrically shaped plug so as to receive fluid from a source of fluid. The first opening is formed to have a single uniform diameter. Connecting the second opening in the cylindrically shaped plug to the first opening. The second opening has a first diameter and a second diameter. The first diameter is larger than the second diameter and the second diameter is the same as the single uniform diameter of the first opening. The second opening second diameter is connected to the first opening. Locating the third opening in the cylindrically shaped plug such that it is open to the atmosphere. The third opening has a first diameter and a second diameter wherein the first diameter is larger than the second diameter and the second diameter is smaller than the single uniform diameter of the first opening. The third opening second diameter is connected to the first opening. Creating a larger flared section in the second opening first diameter that is open to the atmosphere and through which fluid passes. Connecting the cylindrically shaped plug to a pipe carrying fluid such that the fluid passes through the cylindrically shaped plug from the first opening to the second opening.

According to another aspect of this invention, the cylindrically shaped plug is removably attached to a shower pipe. According to a further aspect, the second opening first diameter is formed to be about 4.5 mm and the second opening second diameter and the diameter of the first opening are formed to be about 3 mm. According to another aspect, the larger flared section is formed in an angle of about forty-five degrees and is about five mm in depth. According to another aspect of the invention, the third opening first diameter includes a larger flared section connecting with the smaller second diameter. According to another aspect, the third opening first diameter is formed to be about 2 mm and the third opening second diameter is about 1.5 mm.

DESCRIPTION OF THE DRAWINGS

Other objects, features and advantages of the present invention will become more fully apparent from the following detailed description of the preferred embodiments, the appended claims in the accompanying drawings in which:

DETAILED DESCRIPTION OF THE INVENTION

Figure 1:
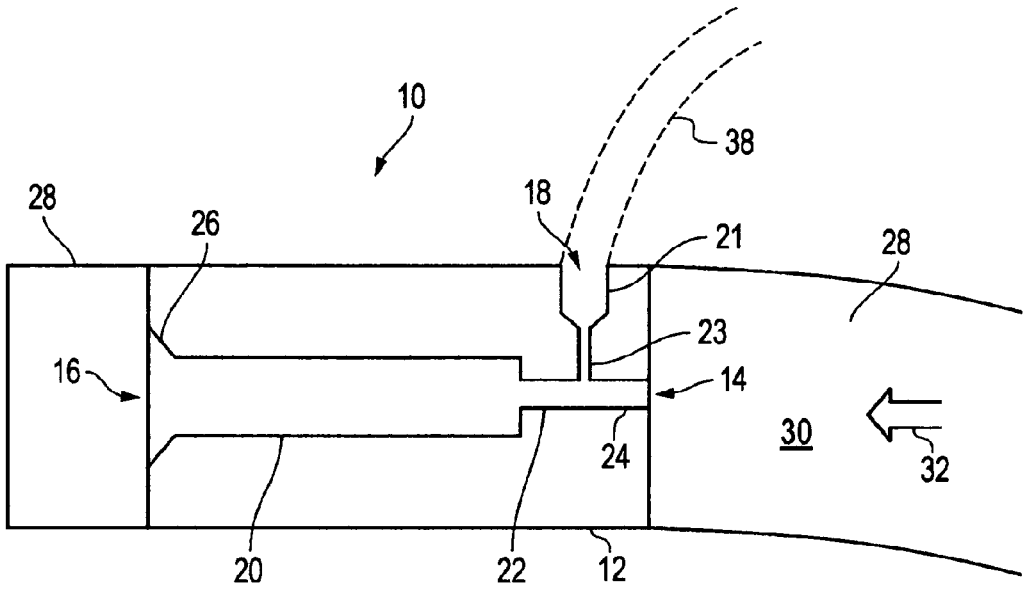
FIG. 1 is a partial sectional view of a preferred embodiment of the vacuum venturi apparatus of the present invention.
Figure 2:
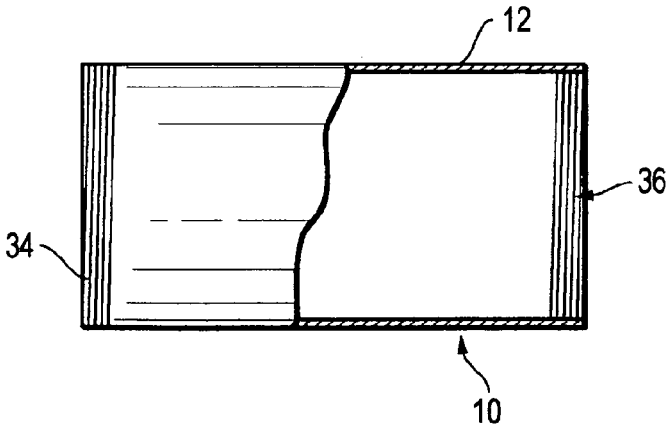
FIG. 2 is a side partial cutaway view of a preferred embodiment of the vacuum venturi apparatus of the present invention with attachment threads on each end.

An embodiment of the present invention is illustrated by way of example in FIGS. 1-2. With specific reference to FIG. 1, a vacuum venturi apparatus 10 according to one embodiment of the present invention, includes plug 12. Plug 12 includes first opening 14, second opening 16, and third opening 18. As illustrated; the second opening 16 is connected to the first opening 14. Second opening 16 has a first diameter 20 and a second diameter 22. As can be seen from the illustration, first diameter 20 is larger than second diameter 22. According to one aspect of the invention, the second diameter 22 is approximately the same diameter as the single uniform diameter 24 of first opening 14. Likewise, third opening 18 has a first diameter 21 and a second diameter 23. The third opening 18 first diameter 21 is, again, larger than second diameter 23. According to the invention, second diameter 23 is always smaller than diameter 24 of first opening 14. The second diameter 23 of the third opening is connected to first opening 14 which has a single uniform diameter 24 as illustrated. As used herein, the term "opening" includes the length of the opening in plug 12, as illustrated, and is not just limited to the beginning of the opening. The openings 14, 16, and 18 have a length and, according to the invention, openings 16 and 18 have a length with at least two different diameters while first opening 14 has a single, uniform diameter. It should be understood that by "single, uniform diameter" it is meant that once chosen the diameter of first opening 14 does not have any other dimension changes. For a variety of reasons, the initial chosen diameter of first opening 14 may vary from one to four mm so as to allow fluid into the apparatus at various flow rates and volumes. For example, if a flow rate of 1.0 gallons per minute (gpm) is desired a smaller first opening 14 would be used than the size for a desired flow of 1.5 gpm.

Still referring to FIG. 1, according to one aspect of the invention, second opening 16 includes flared section 26 and, preferably, third opening 18 includes a flared section 26 as well. Applicant has determined that flared sections 26 are instrumental in increasing the overall efficiency of the vacuum venturi apparatus 10 by working in unison to improve the strength of the seal across the ballast when the vacuum chamber is fired and formed as will be discussed more fully hereafter. The tapering effect (working in unison) at both ends of the device where air is incoming (at opening 18) and water outgoing at second opening 16, creates an evacuation vector of considerably more strength than would otherwise be achieved with a straight-line entrance and exit across both portals. This results in a measurable increase in vacuum strength in mm HG, as discussed hereafter, across the air intake opening, third opening 18. This increase directly affects both the loading of oxygen molecules into the moving stream of water, while providing a boost to the linear acceleration of the moving stream of water as well. The most profound affect achieved is the measurable increase in the efficiency of moving less water (due to an 8:1 stochiometric ratio of loading incoming atmospheric O2:H2O given the increased vacuum pull), in addition to more force of delivery (g-cm/sec2). This is a direct result of the configuration of the vacuum venturi apparatus 10 as shown and disclosed herein including flared sections 26 at the air entry opening 18 and water exit second opening 16. Further, flared section 26 allows third opening 18 to be located closer to first opening 14.

Further, the vacuum venturi is shown located in a pipe 28. Pipe 28 is designed to deliver fluid 30 in the direction of direction arrow 32. Typically, fluid 30 is water and pipe 28 is a shower pipe. As illustrated, plug 12 is conformed to be inserted directly within pipe 28 or attached to it as hereafter disclosed and discussed. As most pipes are cylindrically shaped, according to one embodiment, plug 12 is cylindrically shaped as well and conformed to fit precisely within a pipe 28 such that no fluid escapes around plug 12 and all fluid is forced through plug 12 beginning at first opening 14. That is, fluid 30 is directed toward the first opening 14 which receives fluid 30 into vacuum venturi apparatus 10. Obviously, plug 12 may be any shape now known or hereafter developed that fits the user's preferences and needs. That is, whatever shape pipe 28 is in, plug 12 may be conformed to match and or accommodate it and still function as described herein.

FIG. 1 also illustrates that third opening 18 is open directly to the atmosphere. In the case where plug 12 is inserted within pipe 28, an opening in pipe 28 must be provided to correspond with the third opening 18 in order to provide for the opening to the atmosphere as required by the invention.

As also illustrated, pipe 28 may extend beyond the length of plug 12 and second opening 16. In some cases a shower head (not shown) may be attached to pipe 28 beyond second opening 16 as may suit the purposes of the user. In any event, second opening 16 with or without the flared section 26, is the opening from which fluid 30 passes as it passes through plug 12 in the direction of direction arrow 32 as previously discussed. As such, then, fluid 30 enters first opening 14 passing through plug 12 and exits plug 12 at second opening 16 as illustrated. Obviously, when a shower head is attached to plug 12 second opening 16 is "open to the atmosphere" indirectly.

According to another aspect of the invention, the second opening 16 first diameter 20 is approximately 4.5 mm. Further, according to this aspect of the invention, the second opening 16 second diameter 22 and the single uniform diameter 24 are about 3.0 mm. Likewise, third opening 18 first diameter 21 is larger than third opening 18 second diameter 23. Further, third opening 18 second diameter 23 is smaller than whatever diameter is chosen for first opening 14. According to one aspect of the invention, third opening 18 first diameter 21 is 2.0 mm and third opening second diameter 23 is 1.5 mm and is smaller than the diameter of first opening 14. The Applicant has determined that these diameters work together to produce an extraordinary venturi effect as will be discussed more fully hereafter. In any event, variations of these particular diameters are accommodated within the scope of the present invention so long as the arrangement as discussed and disclosed herein and by way of the figures is maintained such that the second opening 16 first diameter 20 is larger than the second opening 16 second diameter 22 and the third opening 18 first diameter 21 is larger than the third opening 18 second diameter 23 and second diameter 23 is smaller than the diameter of first opening 14 and the connections of the openings are as described. Additionally, according to one aspect of the invention, the flared sections 26 of the second opening 16 and the third opening 18 are angled at about forty-five degrees as illustrated. Further the depth of the flared sections 26 is approximately five mm. Again, a variety of angles and depths are accommodated within the scope of the present invention so long as the relative dimensions and locations are maintained.

Referring now to FIG. 2, a partial side cutaway view of another embodiment of the vacuum venturi 10 of the present invention is disclosed. According to this embodiment, plug 12 includes connection 34 and connection 36. Connection 34, according to one aspect, is a set of external threads and connection 36 is a set of internal threads. Accordingly, where pipe 28 has external threads(not shown), connection 36 internal threads are used to attach plug 12 to the end of pipe 28. Thereafter, a showerhead (not shown) may be attached to plug 12 by use of the connection 34 external threads. Obviously, any connections now known or hereafter developed useful for connecting vacuum venturi apparatus 10 of the present invention are encompassed within the scope of the present invention.

In operation, vacuum venturi apparatus 10 is placed in conjunction with pipe 28. This may be by means of placing plug 12 internally within pipe 28 as discussed above and providing an opening to correspond with the third opening 18 or it may be by means of connections 34 and/or 36 by which vacuum venturi 10 is placed in relation with pipe 28. However it is accomplished, once in place, the flow of fluid 30 is in the direction of direction arrow 32, as illustrated, such that fluid 30 passes first into first opening 14. First opening 14 has a single uniform diameter 24, once chosen. That is, different plugs 12 may be built with first opening of various diameters, yet once chosen, the diameter of first opening 12 does not vary in any plug 12 as shown in the figures. As the fluid 30 passes into first opening 14, Applicant has determined that a small slug of water, in the nature of approximately 0.001 ml, escapes from third opening 18. This acts as a primer that gets the venturi effect functioning. Applicant has determined that this phenomenon will not happen unless there is a "ballast effect" between the entry at first opening 14 and the exit at second opening 16. This ballast effect takes place instantaneously, in hundredths of seconds, and forms a vacuum seal right behind it. If the vacuum seal is not formed immediately behind it, the creation of the venturi effect condition fails and water leaves immediately through third opening 18 to the open atmosphere. It is by means of the combination of the first diameters 20 and 21 and the second diameters 22 and 23 that the vacuum seal is created by means of what the Applicant has identified as the ballast effect. That is to say, the ballast effect is created by the combination of the openings as described with a combination of large and small diameters.

Once the vacuum venturi effect is formed, the partial pressure gradient shifts back over in the direction of second opening 16, from which fluid exits, and the strength of the vacuum grows stronger utilizing the full force of the running stream of fluid 30 as its energy source. Applicant has determined that the vacuum venturi 10 of the present invention pulls an extremely strong −26.6 inches HG of vacuum pressure. This is unheard-of in the industry using only a flowing stream of fluid 30, e.g. water, as the energy source to produce a vacuum of this magnitude. Previously the greatest pressure Applicant was able to create was a −21.4 inches HG. This represents a more than twenty-four percent increase in the overall strength of the venturi. Further, this translates directly into an increase in the efficiency by Applicant's apparatus of about eighteen percent. This efficiency has been measured by Applicant by applying a standard test of moving water volume against time and measuring it in gallons per minute. In sum, Applicant's present invention offers a considerable advantage in improvement in the area of water conservation as a result of its increased strength in its venturi effect.

By way of further illustration of the effectiveness of the venturi effect of the present invention, attachment line 38 (shown in dotted lines) may be attached to third opening 18. When attached, attachment line 38 creates a suction on the end of the attachment line opposite not connected to third opening 18 (not shown)and thus a suction at a remote distance from third opening 18.

What is claimed is:

1. A vacuum venturi apparatus comprising:

a) a plug with a first opening, a second opening and a third opening;

b) the first opening located in said plug so as to receive fluid from a source of fluid said first opening having a single uniform diameter;

c) the second opening in said plug connected to said first opening, said second opening having a first *uniform* diameter and a second *uniform* diameter wherein the first diameter is larger than the second diameter and the second diameter is the same as the single uniform diameter of the first opening and wherein the second opening second diameter is connected to the first opening; and d) the third opening located in said plug, open to the atmosphere *to aerate the fluid moving through said first opening*, the third opening having a first *uniform* diameter and a second *uniform* diameter wherein the first diameter is larger than the second diameter and the second diameter is smaller than the single uniform diameter of the first opening and wherein the third opening second diameter is connected to the first opening.

2. The apparatus of claim 1 wherein said second opening first diameter [includes] *terminates at* a larger flared section open to the atmosphere from which said fluid passes.

3. The apparatus of claim 1 wherein said plug is removably attached to a shower pipe.

4. The apparatus of claim 1 wherein said plug is conformed to fit within a shower pipe.

5. The apparatus of claim 1 wherein said plug includes connections for securing said plug to a shower pipe and connections for securing a shower head to said plug.

6. The apparatus of claim 1 wherein the second opening first diameter is about 4.5 mm and the second opening second diameter and the diameter of the first opening are about 3.0 mm.

7. The apparatus of claim 2 wherein the larger flared section is angled at about forty-five degrees and is about five mm in depth.

8. The apparatus of claim 1 wherein the third opening first diameter is about 2.0 mm and the third opening second diameter is about 1.5 mm.

9. The apparatus of claim 1 wherein said third opening [first diameter] includes a larger flared section *adjacent the third opening first diameter*.

10. The apparatus of claim 9 wherein the larger flared section is angled at about forty-five degrees and is about five mm in depth.

11. The apparatus of claim 1 further including an attachment line connected to the third opening.

12. A vacuum venturi apparatus comprising:

a) a cylindrically shaped plug with a first opening, a second opening and a third opening;

b) the first opening located in said cylindrically shaped plug so as to receive fluid from a source of fluid said first opening having a single uniform diameter;

c) the second opening in said cylindrically shaped plug connected to said first opening, said second opening having a first *uniform* diameter and a second *uniform* diameter wherein the first diameter is larger than the second diameter and the second diameter is the same as the single uniform diameter of the first opening and wherein the second opening second diameter is connected to the first opening;

d) the third opening located in said cylindrically shaped plug, open to the atmosphere *to aerate the fluid moving through said first opening*, the third opening having a first *uniform* diameter and a second *uniform* diameter wherein the first diameter is larger than the second diameter and the second diameter is smaller than the single uniform diameter of the first opening and wherein the third opening second diameter is connected to the first opening; and e) wherein said second opening [first diameter and the third opening first diameter include] *includes* a larger flared section *adjacent the second opening first diameter and wherein the third opening includes a larger flared section adjacent the third opening first diameter*.

13. The apparatus of claim 12 wherein said cylindrically shaped plug is removably attached to a shower pipe.

14. The apparatus of claim 12 further including an attachment line connected to the third opening.

15. The apparatus of claim 12 wherein the larger flared sections are angled at about forty-five degrees and are about five mm in depth.

16. A method of creating a vacuum venturi with a flow of liquid, the method including the steps of:

a) forming a cylindrically shaped plug with a first opening, a second opening and a third opening;

b) locating the first opening in said cylindrically shaped plug so as to receive fluid from a source of fluid and wherein said first opening is formed to have a single uniform diameter;

c) connecting the second opening in said cylindrically shaped plug to said first opening, wherein said second opening has a first *uniform* diameter and a second *uniform* diameter and wherein the first diameter is larger than the second diameter and the second diameter is the same as the single uniform diameter of the first opening and wherein the second opening second diameter is connected to the first opening; and d) locating the third opening in said cylindrically shaped plug, such that it is open to the atmosphere *to aerate the fluid moving through the first opening*, wherein the third opening has a first *uniform* diameter and a second *uniform* diameter and wherein the first diameter is larger than the second diameter and the second diameter is smaller than the single uniform diameter of the first opening and wherein the third opening second diameter is connected to the first opening;

e) creating a larger flared section in said second opening *adjacent the second opening* first diameter and *in* said third opening *adjacent the third opening* first diameter; and f) connecting said cylindrically shaped plug to a pipe carrying fluid such that said fluid passes through said cylindrically shaped plug from the first opening to second opening.

17. The method of claim 16 further comprising the step of connecting an attachment line to the third opening.

18. The method of claim 16 wherein the second opening first diameter is formed to be about 4.5 mm and the second opening second diameter and the diameter of the first opening are formed to be about 3.0 mm.

19. The method of claim 16 wherein the larger flared sections are formed in an angle of about forty-five degrees and is about five mm in depth.

20. The method of claim 16 wherein the third opening first diameter is formed to be about 2.0 mm and the third opening second diameter and the diameter of the first opening are formed to be about 1.5 mm.

* * * * *